Feb. 27, 1934.   J. E. GLEASON ET AL   1,949,014
CUTTER TRUING FIXTURE
Filed July 24, 1930   2 Sheets-Sheet 1
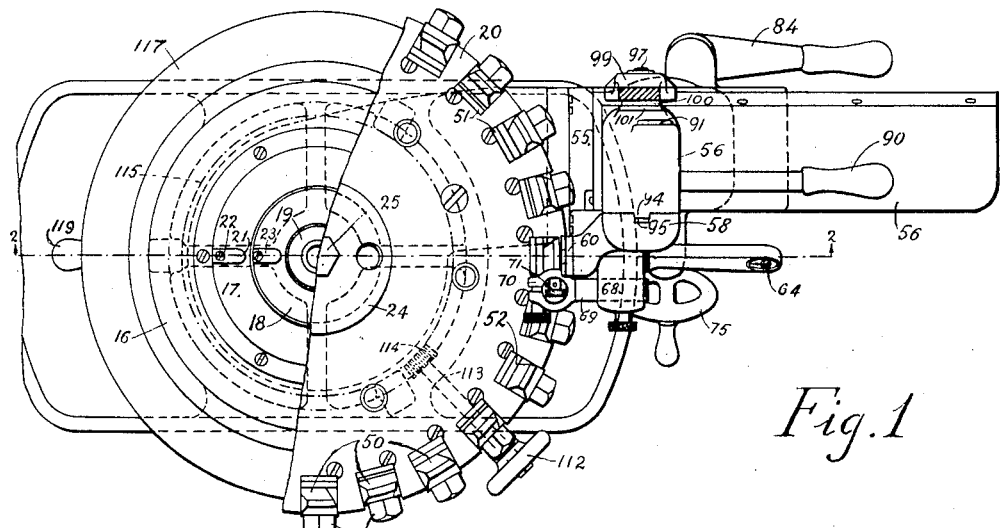
Fig. 1
Fig. 4
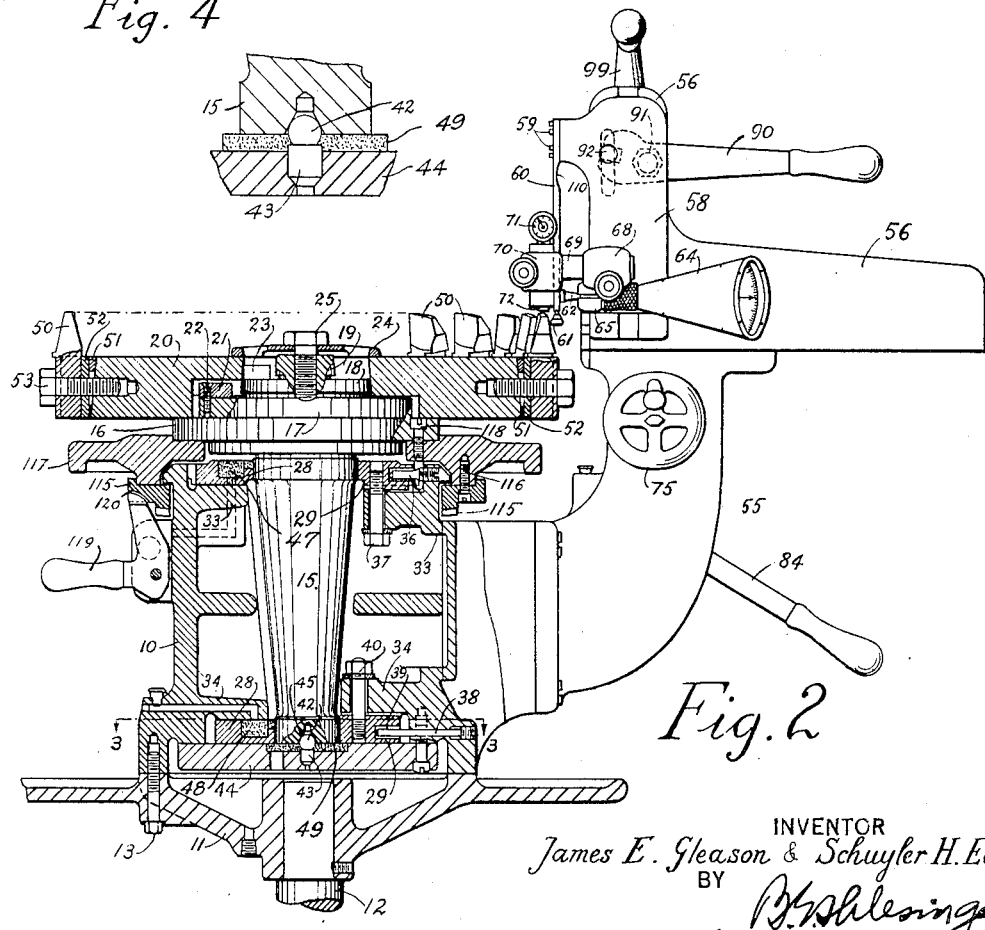
Fig. 2
INVENTOR
James E. Gleason & Schuyler H. Earl
BY
B. F. Schlesinger
their ATTORNEY Feb. 27, 1934. J. E. GLEASON ET AL 1,949,014
CUTTER TRUING FIXTURE
Filed July 24, 1930   2 Sheets-Sheet 2
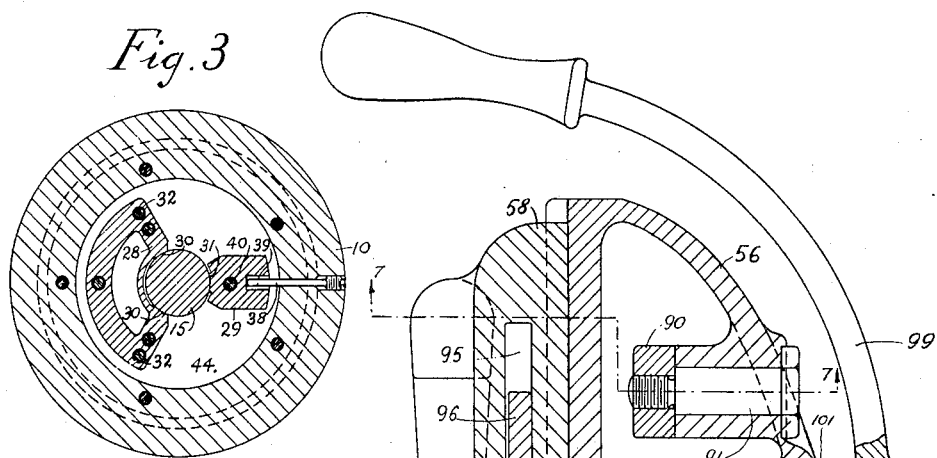
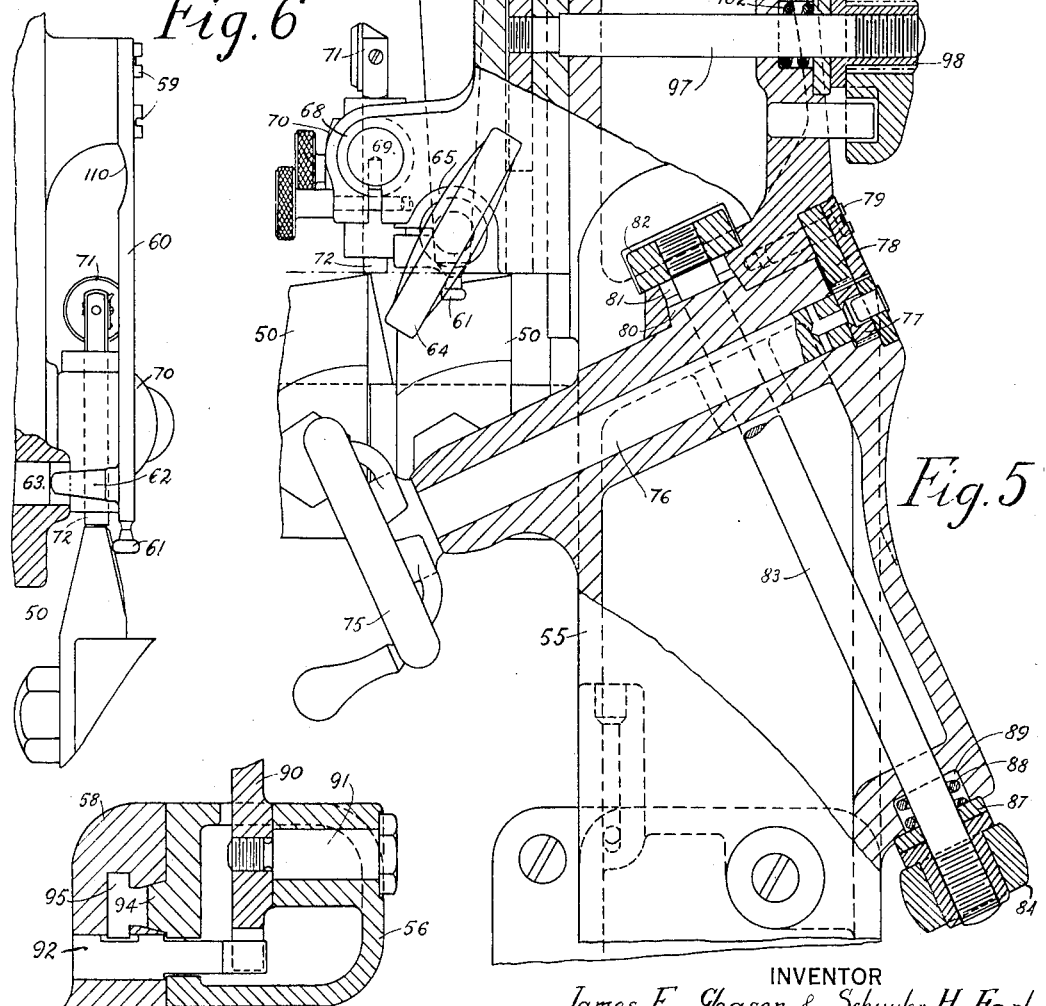
INVENTOR
James E. Gleason & Schuyler H. Earl
BY
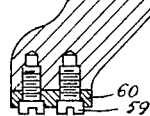
their ATTORNEY Patented Feb. 27, 1934

1,949,014

UNITED STATES PATENT OFFICE 1,949,014

CUTTER TRUING FIXTURE

James E. Gleason and Schuyler H. Earl, Rochester, N. Y., assignors to Gleason Works, Rochester, N. Y., a corporation of New York Application July 24, 1930. Serial No. 470,443

5 Claims. (Cl. 33—172)

The present invention relates to testing apparatus and particularly to apparatus for testing face mill gear cutters to determine the correctness of the setting of the blades in the cutter head.

The primary object of this invention is to provide a simple and efficient device which will permit of testing the individual blades of a cutter successively both for axial and radial positions. To this end, one of the features of the present invention is the provision of a movable contact member which is adapted to engage the sides of the blades and which is so constructed that it will actuate the indicating instrument directly and not, as in previous devices of this nature, through a system of levers and joints, which are liable to be a source of error in themselves. Thus, any error in the radial setting of a blade will be truly registered on the indicating instrument.

A further feature of this invention is the provision of means whereby the same indicating device may be employed for testing the accuracy of the radial setting of both inside and outside cutting blades.

A still further feature of this invention is the provision of means for accurately adjusting the position of the spindle on which the cutter to be tested is mounted so that this spindle will run true and thus there is eliminated any chance of an error in the mounting of the cutter affecting the reading of the setting of a particular blade.

Other features of the invention will be apparent from a reading of the specification and from the recital of the appended claims.

In the drawings:

Figure 1 is a plan view of a cutter truing fixture constructed according to a preferred embodiment of this invention, the cutter to be trued being shown positioned thereon but partly broken away to permit clearer illustration of the construction of the truing device itself;

Fig. 2 is a section on the line 2—2 of Figure 1;

Figure 3 is a section on the line 3—3 of Figure 2;

Figure 4 is a fragmentary sectional view, showing a detail of the mounting of the cutter spindle;

Figure 5 is a view on an enlarged scale, showing details of the mounting of the contact members and indicating gauges;

Figure 6 is a fragmentary view taken at right angles to Figure 5 and showing further details of the mounting of the side and tip contact members; and Figure 7 is a sectional view on the line 7—7 of Figure 5.

10 indicates the base of the truing fixture. This base has a plane lower face so that the fixture may either be mounted directly on a bench or secured on a stand. The latter type of mounting is indicated in the drawings. Here, the truing fixture is secured to the tray 11 of a pedestal or stand, the post of which is designated at 12, by means of bolts 13 which thread into the base 10.

Journaled in the base 10 is the spindle 15 which is adapted to carry the cutter to be tested.

There are several different diameters of face mill gear cutters in use. To permit testing of any of these cutters on the present fixture, the spindle 15 is provided with an enlarged head at its outer end which is formed to provide three different seats 16, 17 and 18. The head terminates in a stud or centering portion 19. The periphery of this centering portion 19, as well as the periphery of the seat 18 is tapered.

In the drawings, a cutter of large diameter is shown secured on the testing fixture for testing. The cutter head 20 rests on the seat 16 and is centered on the spindle 15 by the periphery of the seat 18 which enters the bore of the cutter head. The cutter head is held against rotational movement relative to the spindle by means of a key 21 which is secured by a screw 22 to the seat 17 and which is adapted to engage in a key-slot formed in the cutter head.

Cutters of smaller diameter will seat on the seat 17 and be centered by the periphery of the seat 18 while cutters of the smallest diameter will seat on the seat 18 and be centered by the centering part 19. The cutters of the smallest diameter are held against rotation relative to the spindle 15 by a key 23 which is secured to the seat 18 and is adapted to enter a suitable keyslot formed in the cutter head. Cutters of all diameters are adapted to be secured to the spindle by the clamping plate 24 and the bolt 25.

One of the features of the present invention is the manner in which the spindle 15 is mounted in the base 10 to insure that the spindle runs true. The mounting for the spindle 15 comprises a pair of spaced three-point bearings, which engage the spindle at spaced points along its length, and a center on which the inner end of the spindle is mounted. The three-point bearings provide a mounting for the spindle in which the effect of oil-film on the trueness of rotation of the spindle is reduced to a minimum while the mounting of the spindle on a center eliminates the possibility of a camming action of the spindle while rotating, thereby making for extreme accuracy in the cutter tests.

Each of the three-point bearings comprises a fixed part and an adjustable part. The fixed parts are designated, in each case, at 28 and the adjustable parts at 29. Each fixed part is formed as clearly shown in Figure 3, to provide two bearing points 30 for the spindle 15. Each adjustable part 29 is formed to provide a single bearing point 31 for the spindle. The two points 30 and the single point 31 are properly spaced around the periphery of the spindle to form a secure three-point bearing therefor. The two fixed bearing members 28 are secured by screws 32 to the ledges 33 and 34, respectively, formed internally of the hollow base 10. The adjustable parts 29 are mounted for adjustment with reference to these ledges in a direction radial of the spindle 15. In the case of the upper adjustable part 29, the adjustment is effected by means of a pin 36 that abuts the end wall of the recess formed in the part 29 and threads into a suitable opening formed in the side wall of the base 10. This upper part 29 is held in any adjusted position by means of the bolt 37 which passes through a slot formed in the ledge 33 and threads into a suitable opening formed in the adjustable part 29.

The lower adjustable part 29 is adjusted by a pin 38, the inner end of which abuts the inner end wall of a recess 39 formed in the lower adjustable part 29 and the outer end of which is threaded into a suitable opening formed in the side wall of the base 10. The lower part is secured in any adjusted position by means of the bolt 40 which passes through a slot formed in the ledge 34 and threads into a hole formed in the lower part 29.

The spindle 15 is centered at its inner end on a ball 42 which is flattened on one side to seat on a hardened piece 43 which is secured in the plate 44 that is fastened to the base 10. The spherical portion of the ball 42 engages in a suitable socket 45 formed in the inner end of the spindle 15. The ball 42 is purposely flattened so that the ball will occupy a fixed position at all times and act as a true center, thus avoiding any tendency to form a series of flats around the ball, as would be the case if the ball were truly spherical and left free to rotate.

With the spindle 15 centered up on the ball 42, it can be lined up initially with great accuracy so that it will run true by loosening up on the bolts 37 and 40 and adjusting the bearing part 29. Thus, it is possible to set the spindle so that any chance of any inaccuracy in the spindle mounting affecting the reading on the cutter blade will be absolutely eliminated.

Lubricating felts are provided as indicated at 47, 48 and 49 (Figs. 2 and 4) to keep the spindle bearings properly lubricated.

The cutter head 20 carries a plurality of inserted cutting blades 50, which are adjustable radially of the cutter head by means of wedges 51 and shims 52 which are secured in position on the cutter head by means of bolts 53. It is to test the accuracy of the mounting of these blades both radially and axially in the cutter head that the present truing fixture has been devised.

Secured to the base 10 at one side thereof, is a bracket 55 on which the slide 56 is adjustably mounted. The slide 56 is generally L-shaped and the shorter leg of the L extends in a direction generally parallel to the axis of the spindle 15. This leg of the slide is formed at one side with ways on which a second slide 58 is adjustable.

Secured to the slide 58 at one side thereof, is a flexible steel strip 60. This strip 60 is fastened at one end to the slide 58 by means of screws 59. The other end of the strip is free and either carries or is formed to provide a contact point 61. This contact point is adapted to engage with either the outside or the inside cutting blade of the cutter to test the radial position thereof.

Secured to the strip 60 a little distance above the tip 61 is an actuating contact point 62. The point 62 is adapted to engage the tip of the plunger 63 of an indicating device, of which one type is shown in the drawings but which may be of any suitable type or construction. The indicating device, which is designated at 64 is held in a split-clamp 65 formed integral with the slide 58.

Secured in a second split-clamp 68 formed integral with the slide 58 is a bar 69 which carries a split-clamp 70. In this split-clamp 70 there is secured the barrel of an indicating device 71, which may be of any suitable type, the plunger 72 of which is adapted to engage the tips of the blades of the cutter to test the axial position of these blades.

The contact members 61 and 72 can be brought into proper relation with the particular cutter to be tested for testing the radial and axial positions of the blades of the cutter, by adjusting the slides 56 and 58. The slide 56 can be adjusted on the bracket 55 by rotation of the handwheel 75 which is secured to the shaft 76 that is journaled in the bracket 55. The shaft 76 carries at one end a spur pinion 77 that meshes with a rack 78 which is secured to the slide 56 by means of screws 79. The slide 56 is guided in its adjustment on the bracket 55 by means of the tongues 80 which engages in the slot 81 formed in the slide. The slide 56 is held in any adjusted position by means of the strap 82 into which the bolt 83 threads. This bolt 83 threads at its lower end into a nut that can be rotated by the hand lever 84 and the nut abuts against the collar 87 which is adapted to seat in a suitable socket formed therefor in the bracket 55. Mounted on the bolt 83 and surrounding the same is a coil spring 88 which is housed in a suitable socket 89 in the bracket 55. This spring 88 is interposed between the inner end wall of the socket 89 and the opposing face of the collar 87 so that it exerts through the collar and the nut 86 at all times a clamping pressure on the strap 82 tending to hold the slide 56 frictionally in any adjusted position on the bracket 55. The slide 56 can be secured positively to the bracket by threading up on the nut through movement of the hand lever 84.

It will be noted that the ways formed on the bracket 55 for the slide 56 are inclined to be horizontal as is, also, the shaft 76 which carries the handwheel that operates the rack and pinion for adjustment of the slide 56. This construction is preferred as it makes for greater compactness.

For adjusting the slide 58 on the slide 56, a hand lever 90 is provided. This is in threaded engagement with a pivot pin 91 which is suitably mounted in the slide 56. The lever 90 is furcated at its inner end to engage a pin 92 which is secured to the slide 58. It will be readily seen that when the lever 90 is moved, the slide 58 will be moved on the slide 56. The slide 58 is guided in its adjustment on the slide 56 by means of the tongue 94 formed integral with the slide 56 and which engages in the T-slot 95 formed in the slide 58. The slide 58 is held in any adjusted position by means of the strap 96, which engages in the T-slot 95, and the bolt 97. The bolt 97 is threaded at one end into the strap 96 and at its other end into a nut 98. The nut 98 can be rotated by the hand lever 99. Interposed between the inside face of the nut and the slide 56 is a collar 101. Surrounding the bolt 97 is a coil spring 102. This spring seats in a socket formed therefor in the slide 56 and is interposed between the inside wall of this socket and the opposed face of the collar 101. It acts to cause the strap 96 to hold the slide 58 frictionally in any adjusted position on the slide 56 and the slide 58 can be secured positively in any adjusted position by rotating the lever 99 to thread-up the nut 98 on the bolt 97.

It will be noted that the several levers 84, 90, and 99 and the handwheel 75 are conveniently located where they can be easily manipulated by the operator of the truing fixture.

In truing up a cutter, it is first secured to the spindle 15 by means of the clamping plate 24 and bolt 25. The slide 56 is then adjusted by rotation of the handwheel 75 to bring the contact point 61 into the desired radial position with reference to the axis of the cutter. The desired height adjustment of the contact point 61 can be obtained by adjustment of the slide 58 on the slide 56 by movement of the lever 90. When the contact point 61 has been properly adjusted, the plunger 72 of the indicating device 71 can be adjusted so that it will engage the tips of the cutting blades. The adjustment of the indicating device 71 and plunger 72 can be effected by movement of the bar 69 in the split-clamp 68 and of the barrel of the indicating device in the split-clamp 70.

With the parts in correct testing position, the contact member 61 will be in engagement with one side of one of the blades of the cutter and the tip of the plunger 72 of the indicating device 71 will be in engagement with the tip of either the same blade or the next succeeding blade.

Ordinarily, face mill cutters are made with one inside and one outside blade fixed and ground correctly for height and radial position on the relieving grinder. In this case to true the cutter all that is necessary to do is to true the other blades with reference to these two fixed blades. In this case, a sensitive adjustment of the slides 56 and 58 is not necessary, but should it be desired to true all of the blades of the cutter accurately off of the relieving machine, as would be the case where all of the blades were adjustable, then graduations can be provided on the truing fixture to insure very accurate settings of the slides 56 and 58.

With the contact member 61 in engagement with one side of a blade and the tip of the plunger 72 in engagement with one end of a blade, the readings of the indicating devices 64 and 71, respectively, can be noted or these two devices may be set to zero. The cutter head is then rotated to bring the next blade, or if the cutter head has alternate inside and outside blades, the second next blade into testing position. The readings of the indicating devices 64 and 71, will indicate whether these next blades have the same radial and axial positions as the blades first tested or if not, what adjustment is required to bring the next blades into the same radial and axial positions. In this way, the cutter is rotated step-by-step to test all of the blades. If errors are found, they can be corrected by loosening up on the bolts 53 and changing the positions of the wedges or changing the shims, regrinding, or making such other adjustments as may be necessary, as well understood in the art.

If the cutter being tested has alternate inside and outside blades, one set of blades will be tested first and then the other set. Between the testing of the two sets it will be necessary to shift the position of the contact point 61. This is done by adjustment of the slides 56 and 58. The fact that the same contact point and indicating device can be used to test the radial positions of both inside and outside blades is a very important feature of the present truing fixture, as it eliminates the necessity of employing an additional expensive indicating device.

It will be noted that whether testing inside or outside blades, the indicating device 64 operates as a direct-reading instrument. Any movement which the strip 60 makes caused by an error in the radial position of a blade is transmitted directly to the indicating device 64. There are no links or joints which can cause any error in the reading of the indicating device. To make the truing fixture the more sensitive, the strip 60 can be provided with a kerf as indicated at 110 to make it more flexible. It should be made of spring steel or a similar suitable material.

For rotating the cutter head to bring successive blades into testing position, a handwheel 112 (Figure 1) is provided. This handwheel is secured to a shaft 113 that is suitably journaled in the base 10 and carries at its inner end a bevel pinion 114 that meshes with a bevel gear 115 (Figure 2). The bevel gear 115 is secured by means of screws 116 to a plate 117 which is secured by means of screws 118 to the head of the spindle 15.

For holding the cutter head against rotation as when tightening or loosening the bolts 25 or 54, a hand-lever 119 is provided. This handlever 119 is in the form of a bell-crank, the upper end of which is adapted to be engaged with one of the notches 120 formed in the ring-gear 115. When it is desired to lock the cutter-head against rotation, the locking end of the bell-crank is engaged with one of the notches 120. To release the cutter head, the lever 119 is swung down.

A particular embodiment of the invention has been described, but it will be understood that the invention is capable of modifications and in general it may be said that the present application is intended to cover any variations, uses, or adaptations of our invention following, in general, the principles of the invention and including such departure from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In apparatus for testing face mill gear cutters, a rotatable spindle adapted to carry a cutter to be tested, a support in which said spindle is journaled, a slide mounted on said support for adjustment thereon in a direction radial of said spindle, manually operable means including a rack and pinion for effecting said adjustment, a second slide adjustable on the first in a direction axial of said spindle, manually operable means for effecting the latter adjustment, means for securing each slide on its supporting part comprising in each case, a hold-down strap which engages the slide, a bolt mounted in the supporting part and threaded at one end into said strap and having threaded engagement at its other end with a nut, a spring interposed between the supporting part and the nut to frictionally hold the slide in any adjusted position and means for threading-up said nut to positively secure said slide in any adjusted position, a movable contact member secured to said second slide and adapted to engage the blades of the cutter, and an indicating device mounted on the second slide and having an operative connection with said movable contact member to test the radial position of the blades of the cutter.

2. In apparatus for testing face mill gear cutters, a rotatable spindle adapted to carry a cutter to be tested, a support, a pair of aligned three-point bearings mounted in said support and in which the spindle is journaled, each of said bearings comprising a fixed part and a movable part adjustable radially of said spindle, an indicating device, a support for said indicating device adjustable both radially and axially of said spindle, a strap secured at one end to the last named support and having at its other a contact point adapted to engage the sides of the blades of a cutter to be tested, means secured to said strap adapted to actuate said indicating device, a second indicating device secured to the last named support and adjustable thereon and a contact member cooperating with said second indicating device to test the axial position of the cutter blades, means for adjusting one of said supports angularly relative to the other to test the different blades of the cutter, means for rotating said spindle to bring different blades of the cutter into testing position, and means for securing the spindle against rotation.

3. In apparatus for testing face mill gear cutters, a support for the cutter to be tested, a flexible strap fixed at one end against movement and carrying a contact point at its other end adapted to be engaged with either an outside or an inside cutting blade of said cutter, an indicating device, said strap carrying a second contact member extending laterally from said strap and adapted to actuate said indicating device directly on flexure of said strap, said strap and indicating device being adjustable together in a direction radial of the axis of the cutter to position the two for testing either inside or outside blades of the cutter.

4. In apparatus for testing face mill gear cutters, a support, a rotatable spindle journaled in said support and constructed so as to carry a face mill gear cutter to be tested, a slide adjustably mounted on said support, a second slide adjustably mounted on the first slide, one of said slides being adjustable radially and the other axially of said spindle, a gauge mounted on the second slide and a contact member cooperating with said gauge and also mounted on the second slide and adapted to engage the sides of the blades of a cutter to be tested to permit testing the radial positions of the same, a second gauge adjustable on the second slide independently of the adjustments of said slide and in directions radial and axial of the spindle, and a contact member cooperating with the second gauge and adapted to contact the tips of the blades of a cutter to permit measuring the heights of said blades.

5. In apparatus for testing face mill gear cutters, a support, a rotatable spindle constructed so as to carry at one end a face mill gear cutter to be tested and having a socket in its other end, means for mounting the spindle on the support comprising a flattened ball on which one end of the spindle is mounted and a pair of aligned three-point bearings in which the spindle is journaled, said support having a plane-seat in alignment with said spindle and said flattened ball having its flat portion resting against said seat and having its spherical portion entering the socket of the spindle, and said three-point bearings each comprising a part fixedly secured to said support and a part adjustably mounted thereon for adjustment toward and from the axis of the spindle, a slide adjustably mounted on said support, a second slide adjustably mounted on the first slide, one of said slides being adjustable radially and the other axially of said spindle, a gauge mounted on the second slide, a flexible strap fixedly secured at one end to the second slide but flexible in a direction radial of said spindle, a contact member carried at the free end of the strap for engagement with the sides of the blades of a cutter to be tested, and means carried by the strap and operable to directly actuate said gauge on flexure of the strap to test the radial positions of said blades.

JAMES E. GLEASON.
SCHUYLER H. EARL.